Jan. 2, 1951   W. W. KEMP   2,536,608
IMMERSION LIQUID HEATING APPARATUS AND METHOD
Filed Aug. 4, 1945   3 Sheets-Sheet 1
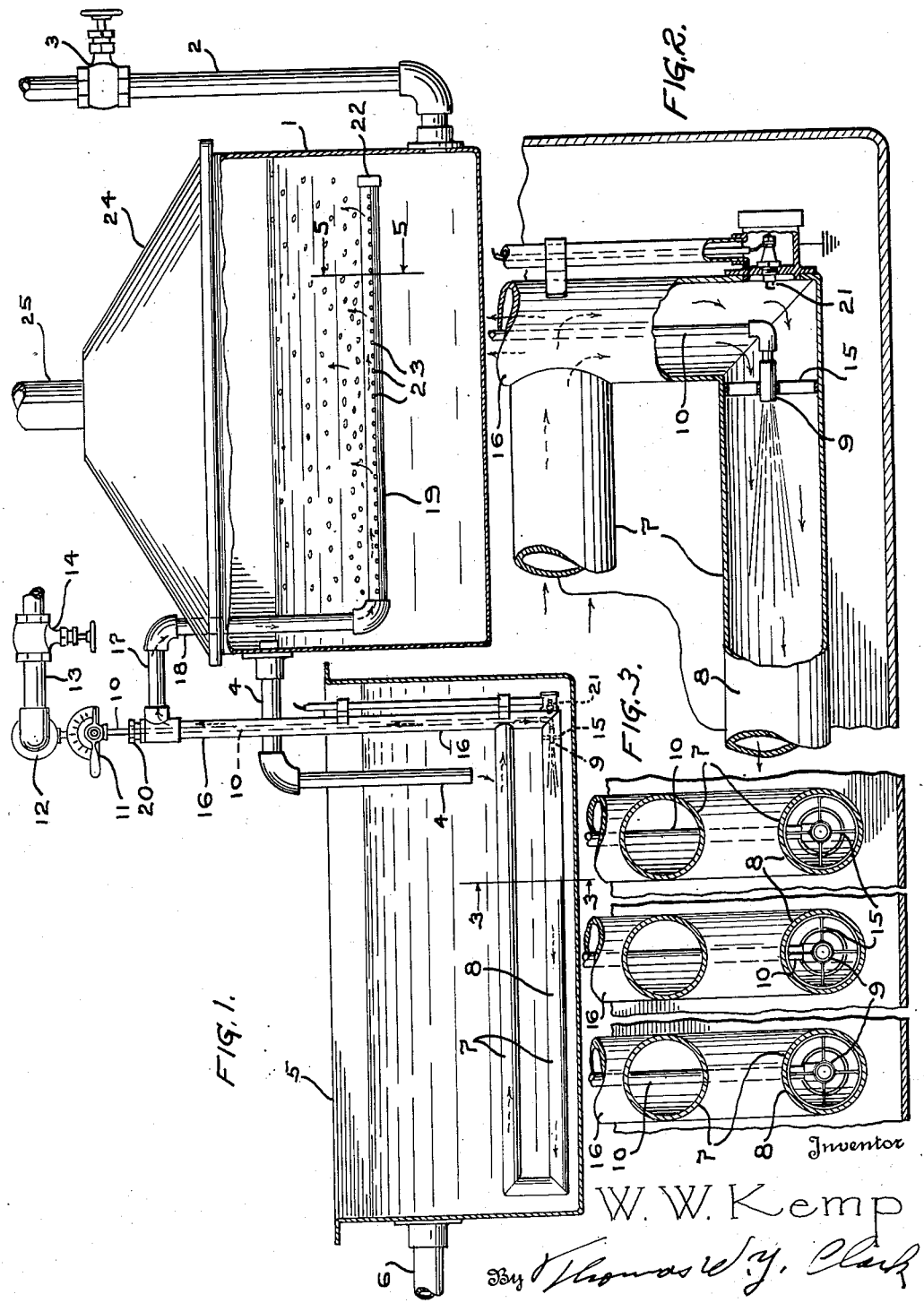

Jan. 2, 1951 W. W. KEMP 2,536,608
IMMERSION LIQUID HEATING APPARATUS AND METHOD
Filed Aug. 4, 1945 3 Sheets-Sheet 2

Inventor
W. W. Kemp
By Thomas W. J. Clark
Attorney

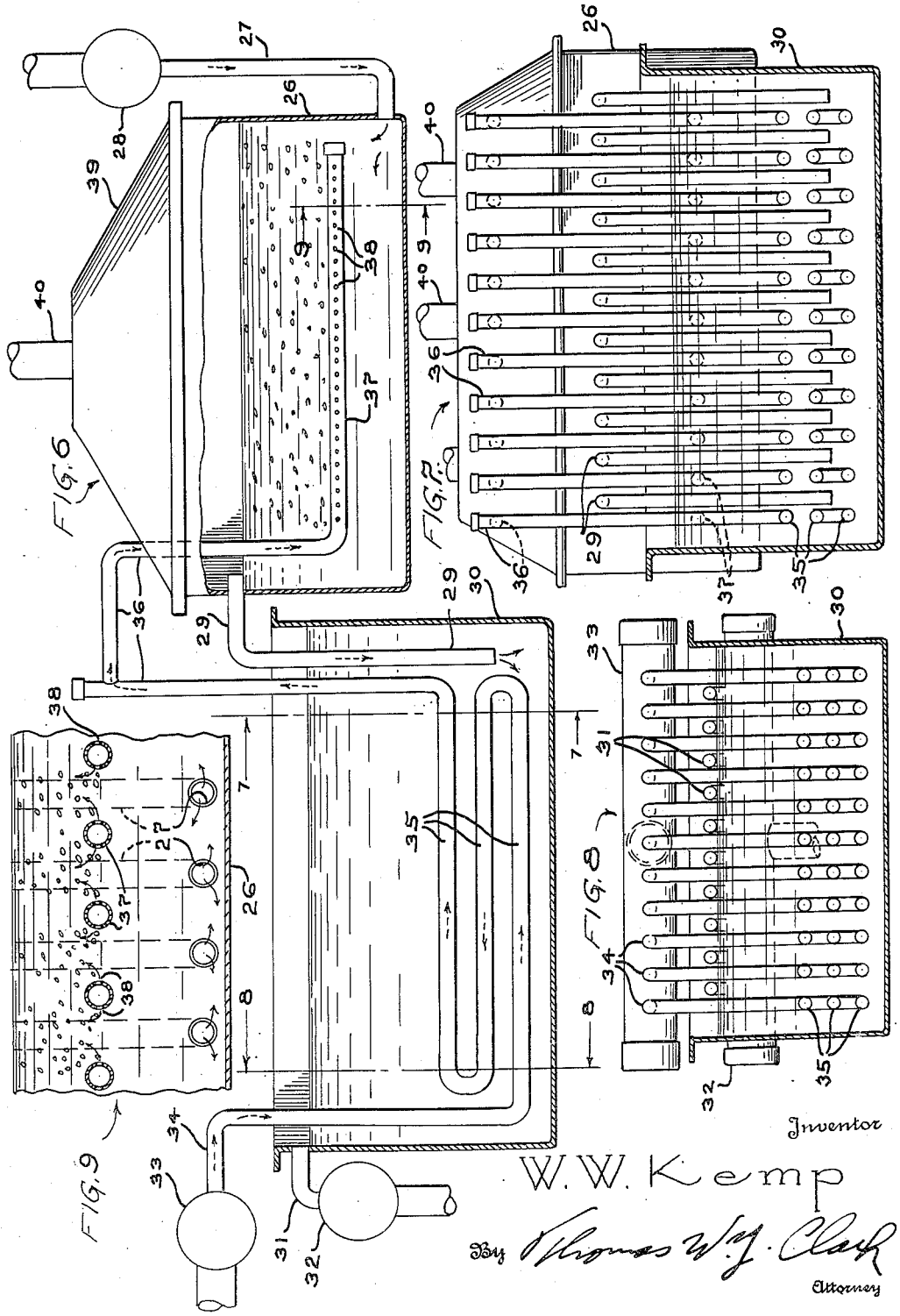

Patented Jan. 2, 1951

2,536,608

UNITED STATES PATENT OFFICE 2,536,608

IMMERSION LIQUID HEATING APPARATUS AND METHOD

William Wallace Kemp, Baltimore, Md., assignor to The C. M. Kemp Manufacturing Company, Baltimore, Md., a corporation of Maryland Application August 4, 1945, Serial No. 608,896

9 Claims. (Cl. 126—360)

This invention relates to a heater for raising the temperature of a large volume of liquid very rapidly.

Although the transfer of heat to liquid by passing hot gases thereinto is rapid, it is well known that liquid does not absorb all the heat from the heated gases that may be passed through the liquid. When the temperature of the liquid reaches a certain point the liquid evaporates as quickly as it absorbs more heat, so that the heated gases are not effective beyond a certain limit.

Heat may also be transferred to fluid through continuous or endless metal tubes carrying heated gases or in which a flame may burn and hot gases circulate, but while the repeated circulation of the gases through a continuous passage makes a very efficient heat exchanger, it is desirable for even greater efficiency, to extract practically all the heat from the escaping gases by discharging these gases from small openings under the surface of the liquid in a separate or preheating tank.

It has been found that an integrated combination of these two methods, and apparatus, will not only heat a large body of fluid rapidly, but that it will accomplish this purpose with a very high degree of efficiency.

The object of this invention is therefore to produce a heating plant and method that will heat a large body of liquid rapidly, and to a high temperature, with great efficiency.

Other objects and advantages of the invention will be apparent from the following description and the accompanying drawings forming a part hereof and in which:

Figure 1 is an end elevation of a heating plant, partly in section and partly broken away, embodying this invention.

Figure 2 is an elevation partly in section of one of the combustion heating elements showing the burner therein.

Figure 3 is a sectional view of some of the combustion heating elements on line 3—3 of Figure 1.

Figure 6 is an end elevation, partly in section and partly broken away, of a modified form of heating plant.

Figure 7 is a sectional view thereof on line 7—7 of Figure 6.

Figure 8 is a further sectional view thereof on line 8—8 of Figure 6.

Figure 9 is a fragmentary sectional view on line 9—9 of Figure 6.

Figure 4:
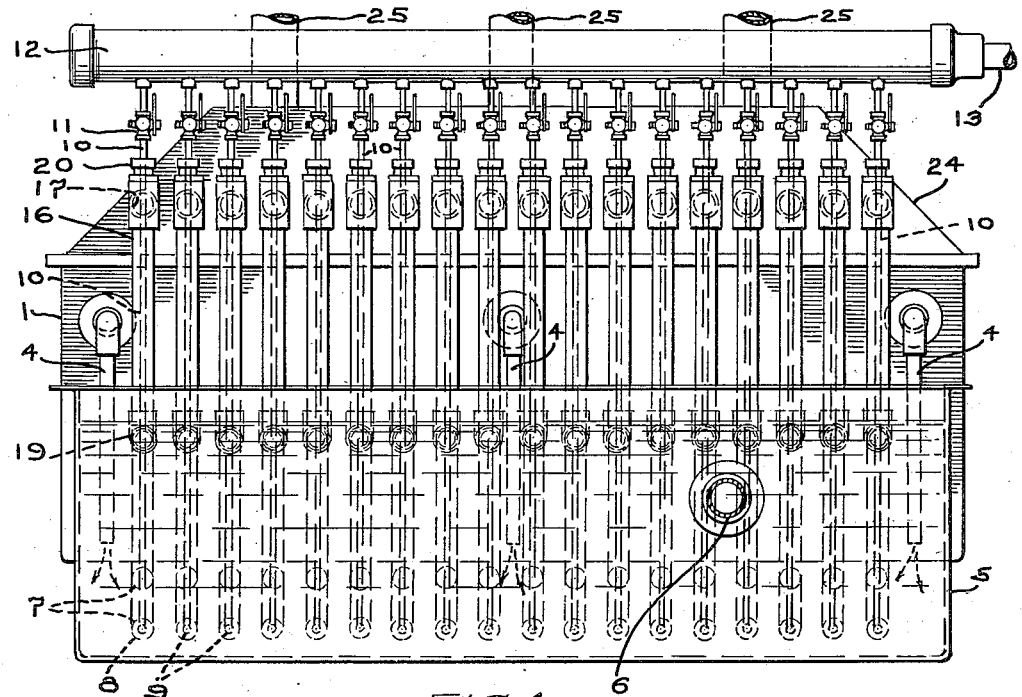
Figure 4 is an elevation from the left of Figure 1.
Figure 5:
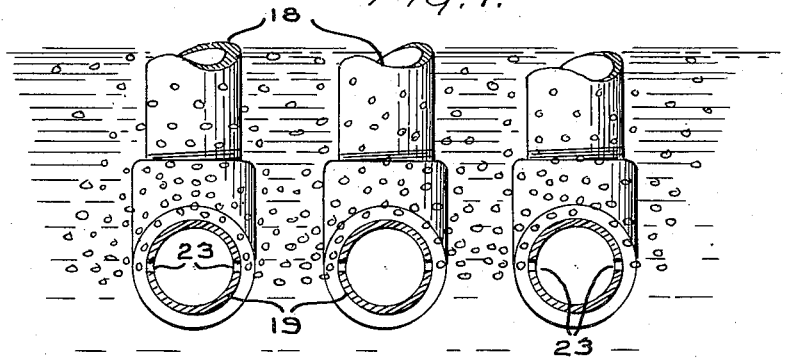
Figure 5 is a sectional view of some of the gas discharge elements on line 5—5 of Figure 1.

Liquid such as water may be fed to tank 1 by means of pipes 2 having valves 3 thereon and the pipes 2 preferably enter the tank 1 near the bottom of the tank. The water or other liquid flows from near the top of the tank 1 through pipes 4 to near the bottom of tank 5 and it is drawn from tank 5, near the top, by means of pipes 6.

Heat is introduced to the plant by means of the bank of submerged combustion heaters 7. These heaters are individually of tubular formation and form endless passages for the flow of heated gases therearound. The gases are produced by the combustion of a completely combustible air-gas mixture at the orifice of the burners 9. The blast of the flame pushes the gases forward, at the same time drawing from the rear and they are reheated every time they pass around the flame. A completely combustible mixture is introduced to the heaters through means of burners 9 fed by pipe 10, regulated by valve 11 and the whole bank of burners is fed from one manifold 12 which in turn is fed by fuel line 13, flow from which is regulated by valve 14. The burner 9 is held by spider 15 in the leg 8. This spider allows for the constant flow of heated gases past the burner and the burner constantly adds further heat to the circulating gases. The final exhaust or vent for the excess gases in the submerged heater is through pipe 16 connected by horizontal and vertical branches 17 and 18 to horizontal gas discharge elements 19. Pipe 10 passes through the center of the exhaust pipe 16 and there is a cap 20 over the upper end of pipe 16 through which pipe 10 tightly passes.

The burner 9 is ignited by means of a spark plug or other igniter 21 which is preferably slightly removed from the hottest part of the circulating gases. The heating element described is substantially like that shown in Kemp et al. Patents Nos. 1,244,863 and 1,244,864.

The completely combustible mixture of air and gas may be fed to pipe 13 by means of an apparatus such as that shown in the Kemp et al. Patent No. 1,771,223 and the air-gas mixing device may be such as that shown in that patent or such as that shown in the Kemp et al. Patent No. 1,880,141. In order to avoid the passage of impurities to the liquid in the tank 1 it is quite important that the combustion of the fuel and air be complete so that no impurities are carried into the liquid in tank 1. The heated gases entering tank 1 should be inert. It will be apparent, however, that should it be desired to treat the liquid in any manner the treating gas could be initially introduced through the pipe 13.

The gas discharge elements in tank 1 comprise the horizontally arranged pipes 19 which are capped at the end 22 and which have in their sides orifices 23 arranged to discharge the heated inert gas in the liquid in tank 1. It is desirable that the pipes 19 should not be too low in the liquid in tank 1 because otherwise the completely combustible mixture entering pipe 13 would have to be under greater pressure. Most efficient results are obtained by consuming the major portion of the heat from the combustion in the submerged combustion heaters 7 in tank 5 and utilizing any residual heat to initially heat the liquid in tank 1. It has been found that by placing the heating elements in both tanks quite close together that a large amount of heat may be transferred to the liquid in a very short time. The spacing of the heating elements is regulated by the exact requirements that may be made upon the plant.

It is apparent that the bubbling of the heated gases from the orifices 23 will carry with the bubbles a considerable amount of moisture as the gas escapes from the surface of the liquid. A top 24 is placed over tank 1 and is provided with stacks 25 which carry off the spent gases after the moisture in the gases is condensed by the top 24 and flows back into tank 1.

By the apparatus illustrated liquids in tank 5 may be raised to a temperature of 212° F. and should a greater temperature be required, tank 5 could be covered and placed under pressure and steam could be generated.

In the modification shown in Figures 6–9, liquid is fed to tank 26 by pipes 27 fed from manifold 28, and from tank 26, the liquid is fed by pipes 29, to tank 30, and drawn from tank 30 by pipes 31 and manifold 32.

Heated gas from other industrial operations such as boiler or furnace installations, is fed to tank 30 by means of manifold 33, and closely spaced heating pipes 34, which are given an S formation 35 in the bottom of the tank 30 to extract substantially all the heat therefrom. Such residual heat as may remain in the pipes 35 is passed by means of sections 36 to gas discharge elements 37, in tank 26, where the gas is discharged through orifices 38 to heat the incoming fluid in tank 26. Tank 26 has a cover 39 and stacks 40, similar to those in Figure 1. Virtually all heat remaining in the gases fed to manifold 33 is extracted by the liquid in tanks 26 and 30.

It will be apparent that many modifications may be made in the forms of the apparatus illustrated without departing from the invention as described in the appended claims.

What is claimed as new and is desired to be secured by Letters Patent is:

1. A liquid heater comprising two tanks, the first having means to feed liquid thereto, means to pass the liquid therefrom to the second tank, a plurality of parallel closely spaced heating elements in and near the bottom of the second tank, a plurality of closely spaced gas discharge elements in and extending across the first tank below the liquid level thereof and having spaced gas outlets in the wall thereof, the first tank having an opening to the atmosphere, each heating element having a circuitous passage for the passage of hot gases therethrough, means to pass hot gases to said heating elements, each heating element having a vent, the vent of each heating element being connected to one of said gas discharge elements in the first tank, through the outlets of which all the exhaust gases from the heating elements pass into the liquid in the first tank to heat the same, prior to the passage of that liquid to the second tank, and the spent gases after passing through the liquid in the first tank, passing through the said opening to the atmosphere.

2. A liquid heater comprising two tanks, the first having means to feed liquid thereto, means to pass the liquid from the top thereof to the second tank, a plurality of parallel closely spaced combustion heating elements in and near the bottom of the second tank, a plurality of closely spaced gas discharge elements in and extending across the first tank below the liquid level thereof and having spaced gas outlets in the wall thereof, each heating element comprising a tube doubled back upon itself to form an endless loop and having a continuous passage therein and a burner therein, a fuel inlet to said heating element and a vent, the vent of each element being connected to one of said gas discharge elements in the first tank, through the outlets of which the exhaust gases pass into the liquid to heat the same, and means including said fuel inlet to pass a combustible mixture of fuel to said burners, under pressure, to support and project a flame therefrom, and to project the combustion gases around said continuous passage, the combustion heating elements completely enclosing the flame and the flame under pressure circulating and recirculating the hot gases therein, around the flame to heat the gases and thereby to heat the elements and the liquid.

3. A liquid heater comprising two tanks, the first having means to feed liquid thereto, means to pass the liquid from the top thereof to the second tank, a plurality of closely spaced gas discharge elements in and extending across the first tank below the liquid level thereof and having spaced gas outlets in the wall thereof, a plurality of parallel closely spaced combustion heating elements in and near the bottom of the second tank, each element comprising a tube doubled back upon itself to form an endless loop and having a continuous passage therein and a burner therein, a fuel inlet to said heating element and a vent, the vent of each element being connected to one of said gas discharge elements in the first tank, through the outlets of which the exhaust gases pass into the liquid to heat the same, and means including said fuel inlet to pass a combustible mixture of fuel to said burners under pressure, to support and project a flame therefrom, and to project the combustion gases around said continuous passage, the combustion heating elements completely enclosing the flame and the flame under pressure circulating and recirculating the hot gases therein, around the flame to heat the gases and thereby to heat the elements and the liquid, the inlet for each combustion element being through the vent thereof.

4. A liquid heater comprising two tanks, the first having means to feed liquid thereto and means to pass the liquid from the top thereof to the second tank, and means to draw liquid from the second tank, a plurality of closely spaced tubular combustion heating elements in and near the bottom of the second tank, each element comprising a tube doubled back upon itself to form an endless loop and having a continuous passage therethrough and a vent and an inlet and a burner, means to pass a combustible mixture of fuel to said burner under pressure, to support and project a flame therefrom, the flame circulating and recirculating combustion gases in the elements, means to pass the exhaust gases from the vents of said elements to the first tank and to discharge the same in and substantially throughout the body of the liquid in the first tank to substantially raise the temperature thereof.

5. A liquid heater comprising two tanks, the first having means to feed liquid thereto and means to pass the liquid from the top thereof to the second tank, and means to draw liquid from the second tank, a plurality of closely spaced tubular combustion heating elements in and near the bottom of the second tank each element comprising a tube doubled back upon itself to form an endless loop and having a continuous passage therethrough and a vent and an inlet and a burner, means to pass a combustible mixture of fuel through the heated gases from the vent of the element to said burner under pressure to support and project a flame therefrom, the flame, circulating and recirculating combustion gases in the elements, means to pass the exhaust gases from the vents of said elements to the first tank and to discharge the same in and substantially throughout the body of the liquid in the first tank to substantially raise the temperature thereof.

6. A liquid heater comprising two tanks, the first having means to feed liquid thereto and means to pass the liquid from the top thereof to the second tank, and means to draw liquid from the second tank, a plurality of closely spaced tubular combustion heating elements in and near the bottom of the second tank each element comprising a tube doubled back upon itself to form an endless loop and having a continuous passage therethrough and a vent and an inlet and a burner, means to pass a combustible mixture of fuel to said burner under pressure, to support and project a flame therefrom, the flame circulating and recirculating combustion gases in the elements, said last named means passing into the elements through a vent thereof, means to pass the exhaust gases from the vents of said elements to the first tank and to discharge the same in and substantially throughout the body of the liquid in the first tank to substantially raise the temperature thereof.

7. A liquid heater comprising two tanks, the first having means to feed liquid thereto and means to pass the liquid from the top thereof to adjacent the bottom of the second tank, and means to draw liquid from the second tank, a plurality of closely spaced tubular combustion heating elements in and near the bottom of the second tank each element comprising a tube doubled back upon itself to form an endless loop and having a continuous passage therethrough and a vent and an inlet and a burner, means to pass a combustible mixture of fuel to said burner under presure, to support and project a flame therefrom, the flame circulating and recirculating combustion gases in the elements, means to pass the exhaust gases from the vents of said elements to the first tank and to discharge the same in and substantially throughout the body of the liquid in the first tank to substantially raise the temperature thereof, means to collect liquid vaporized by escaping gases from the first tank and to return it thereto.

8. The process of quickly heating liquid to high temperatures in a system which continuously maintains two bodies of liquid, liquid from one body flowing to the second body, comprising projecting a flame of a completely combustible fuel mixture into a walled passage within and closed to the second of said bodies of liquid and liberating exhaust inert gases discharged from said flame directly into and throughout said one body of liquid from the passage of said second body of liquid to substantially raise the temperature of the said one body.

9. The process of quickly heating liquid to high temperatures in a system in which liquid flows from one container to a second container comprising passing hot gas through a walled passage within and closed to the liquid in the second container to heat the liquid therein by conduction and then liberating the gas from the passage of the second container directly into the liquid in the first mentioned container to preheat the liquid flowing to the second container by direct contact of the gas with the liquid and thereby to extract the maximum heat from the gas.

WILLIAM WALLACE KEMP.

REFERENCES CITED

The following references are of record in the file of this patent:

UNITED STATES PATENTS

| Number | Name | Date |
|---|---|---|
| 1,247,905 | Troost | Nov. 27, 1917 |
| 1,313,947 | Lafferty | Aug. 26, 1919 |
| 1,371,876 | Dowd | Mar. 15, 1921 |
| 1,716,433 | Ellis | June 11, 1929 |
| 2,118,479 | See et al. | May 24, 1938 |
| 2,185,594 | Kittel | Jan. 2, 1940 |
| 2,204,051 | Ritts et al. | June 11, 1940 |
| 2,233,675 | Narten | Mar. 4, 1941 |
| 2,358,302 | Brosius | Sept. 19, 1944 |

FOREIGN PATENTS

| Number | Country | Date |
|---|---|---|
| 392,747 | Great Britain | May 25, 1933 |